(12) United States Patent
Rossi

(10) Patent No.: US 11,593,893 B2
(45) Date of Patent: Feb. 28, 2023

(54) MULTI-ITEM INFLUENCE MAXIMIZATION

(71) Applicant: Adobe Inc., San Jose, CA (US)

(72) Inventor: Ryan A. Rossi, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 83 days.

(21) Appl. No.: 16/677,007

(22) Filed: Nov. 7, 2019

(65) Prior Publication Data

US 2021/0142425 A1    May 13, 2021

(51) Int. Cl.
*G06Q 50/00* (2012.01)
*G06Q 30/02* (2012.01)
*G06Q 30/0201* (2023.01)
*G06Q 30/0273* (2023.01)
*G06Q 30/0251* (2023.01)

(52) U.S. Cl.
CPC .......... *G06Q 50/01* (2013.01); *G06Q 30/0201* (2013.01); *G06Q 30/0255* (2013.01); *G06Q 30/0269* (2013.01); *G06Q 30/0274* (2013.01)

(58) Field of Classification Search
CPC ............... G06Q 50/01; G06Q 30/0274; G06Q 30/0201; G06Q 30/0255; G06Q 30/0269
See application file for complete search history.

(56) References Cited

U.S. PATENT DOCUMENTS

| | | | | |
|---|---|---|---|---|
| 2007/0121843 | A1* | 5/2007 | Atazky | G06Q 30/0269 379/114.13 |
| 2009/0228296 | A1* | 9/2009 | Ismalon | G06Q 30/02 705/319 |
| 2011/0270774 | A1* | 11/2011 | Varshavsky | H04L 63/126 705/347 |
| 2013/0060644 | A1* | 3/2013 | Le Ouay | G06Q 30/0241 705/14.69 |
| 2014/0115010 | A1* | 4/2014 | Seth | G06F 16/9024 707/798 |

OTHER PUBLICATIONS

Lynn & Lee, "Maximizing Influence in an Ising Network: A Mean-Field Optimal Solution", 30th Conference on Neural Information Processing Systems (NIPS 2016, pp. 1-9), Barcelona, Spain (Year: 2016).*

(Continued)

*Primary Examiner* — Mario C. Iosif
(74) *Attorney, Agent, or Firm* — FIG. 1 Patents

(57) ABSTRACT

In implementations of multi-item influence maximization, a computing device can obtain updates to a user association graph that indicates social correspondence between users, and obtain updates to a user-item graph that indicates user correspondence with one or more items. The computing device includes an influence maximization module that can update an item association graph that indicates item correspondence of each item with one or more other items, where the item association graph can be updated based on the user-item graph that indicates the user correspondence with one or more of the items. The influence maximization module can then iteratively determine a resource allocation for each of the users to maximize user influence of multiple items that are associated in the item association graph and based on the social correspondence between the users, as well as assign a variable portion of the resource allocation to any number of the users.

20 Claims, 6 Drawing Sheets

(56) References Cited

OTHER PUBLICATIONS

Ackerman, "Combinatorial Model and Bounds for Target Set Selection", Oct. 25, 2010, 9 pages.
Bhagat, "Maximizing Product Adoption in Social Networks", In Proceedings of the 9th ACM International Conference on Web Search and Data Mining (WSDM '12)., Feb. 8, 2012, 10 pages.
Bharathi, "Competitive Influence Maximization in Social Networks", Dec. 12, 2007, 6 pages.
Borodin, "Threshold Models for Competitive Influence in Social Networks", In Proceedings of International Workshop on Internet and Network Economics (WINE '10), vol. 6484., Dec. 13, 2010, 12 pages.
Budak, "Limiting the Spread of Misinformation in Social Networks", In Proceedings of the 20th International Conference on World Wide Web (WWW'11), Mar. 28, 2011, 10 pages.
Chen, "Efficient Influence Maximization in Social Networks", In Proceedings of the 15th ACM SIGKDD international conference on Knowledge discovery and data mining, Jun. 2009, 9 pages.
Chen, "Scalable Influence Maximization in Social Networks under the Linear Threshold Model", In 2010 IEEE international conference on data mining (ICDM'10)., Dec. 13, 2010, 10 pages.
Chiang, "Some Results on the Target Set Selection Problem", Nov. 29, 2011, 16 pages.
De, "Learning and Forecasting Opinion Dynamics in Social Networks", May 24, 2016, 20 pages.
Domingos, "Mining the Network Value of Customers", Seventh International Conference on Knowledge Discovery and Data Mining, 2001., Aug. 26, 2001, 10 pages.
Du, "Scalable Influence Estimation in Continuous-Time Diffusion Networks", In Advances in neural information processing systems (NIPS'13)., Dec. 5, 2013, 16 pages.
Du, "Scalable Influence Maximization for Multiple Products in Continuous-Time Diffusion Networks", Journal of Machine Learning Research 18, 2 (2017), Feb. 2017, 45 pages.
Galstyan, "Maximizing Influence Propagation in Networks with Community Structure", May 7, 2009, 7 pages.
Gomez-Rodriguez, "Influence Maximization in Continuous Time Diffusion Networks", May 8, 2012, 8 pages.
Goyal, "A DataBased Approach to Social Influence Maximization", Proceedings of the VLDB Endowment 5, 1 (2011), Sep. 1, 2011, 12 pages.
Goyal, "CELF: Optimizing the Greedy Algorithm for Influence Maximization in Social Networks", Jan. 2011, 3 pages.
Goyal, "SIMPATH: An Efficient Algorithm for Influence Maximization under the Linear Threshold Model", 2011 IEEE 11th International Conference Data Mining (ICDM), Dec. 11, 2011, 10 pages.
He, "A Novel Top-k Strategy for Influence Maximization in Complex Networks with Community Structure", Dec. 18, 2015, 10 pages.
He, "Influence Blocking Maximization in Social Networks under the Competitive Linear Threshold Model", Oct. 21, 2011, 12 pages.
He, "Robust Influence Maximization", Jun. 10, 2016, 24 pages.
Kempe, "Maximizing the Spread of Influence through a Social Network", SIGKDD, 2003., Aug. 24, 2003, 10 pages.
Leskovec, "Cost-effective Outbreak Detection in Networks", In Proceedings of the 13th ACM SIGKDD international conference on Knowledge discovery and data mining, Aug. 2007, 10 pages.
Lynn, "Maximizing Activity in Ising Networks via the TAP Approximation", Apr. 17, 2018, 9 pages.
Lynn, "Maximizing Influence in an Ising Network: A Mean-Field Optimal Solution", Feb. 19, 2017, 9 pages.
Morone, "Influence maximization in complex networks through optimal percolation", Jun. 27, 2015, 83 pages.
Richardson, "Mining Knowledge-Sharing Sites for Viral Marketing", Jul. 23, 2002, 10 pages.
Yang, "Continuous Influence Maximization: What Discounts Should We Offer to Social Network Users?", Jan. 26, 2016, 15 pages.
Zhang, "Intertwined Viral Marketing in Social Networks", Jul. 2016, 9 pages.

\* cited by examiner

MULTI-ITEM INFLUENCE MAXIMIZATION

BACKGROUND

Generally, influence maximization in the context of social networks is the problem of determining a small subset of nodes, commonly referred to as the seed nodes (e.g., persons), in a social network who will maximize the spread of influence. Many real-world applications of data mining seek to understand or determine user behaviors, relationships, and the interdependencies in social networks, particularly in the context of influence maximization applied to viral marketing. For example, a company may want to make the best use of a limited advertising budget for product promotion, and seeks to select a small set of users who are most likely to promote or influence the product in a social context. These users represent the seed nodes, or seeds, that are determined as the ones most likely to recommend the product to friends and followers via their online presence in social networks, resulting in increased product sales, brand awareness, and/or marketing for the company.

Notably, the goal of influence maximization then is to identify the top influential users in the context of social networking so that the coverage or exposure of an item, such as a product, marketing promotion, or any other promotable entity or concept, is maximized by the influence, also referred to as influence diffusion. Given social correspondence between users, the influence maximization problem aims to identify the small subset of seed nodes who maximize the spread of influence by way of online social friendships, relationships, communications, and/or interactions. However, conventional techniques of influence maximization tend to focus on maximizing the user coverage of one product or item via the social correspondence between the users. For example, an advertiser who seeks to distribute resources, such as an advertising budget, promotes a single item using influence maximization to determine the social influencers who are most likely to promote or influence the item. Further, the small subset of seed nodes who are determined to be the social influencers are all allocated an equal portion of the budget or resources, given discrete budget settings that assume the same amount of budget or resources will be equally effective among the determined social influencers.

SUMMARY

This Summary introduces features and concepts of multi-item influence maximization, which is further described below in the Detailed Description and shown in the Figures. This Summary should not be considered to describe essential features of the claimed subject matter, nor used to determine or limit the scope of the claimed subject matter.

Aspects of multi-item influence maximization are described. In implementations, a computing device can receive and maintain data in the form of updated graphs, from which multi-item influence maximization can be solved for a budget or other resource in an iterative, continuous manner. The computing device can obtain or receive updates to a user association graph that indicates social correspondence between users, as well as obtain or receive updates to a user-item graph that indicates user correspondence with one or more items. The computing device implements an influence maximization module that can derive and/or update an item association graph, which indicates item correspondence of each item with one or more other items, and the item association graph can be derived and/or updated based on the user-item graph that indicates the user correspondence with one or more of the items. The influence maximization module can then iteratively determine a resource allocation for each of the users to maximize user influence of multiple items that are associated in the item association graph and based on the social correspondence between the users.

For example, the items may be consumer products, and the resource allocation is an advertising budget that is allocated to the users to promote the consumer products. The influence maximization module can continuously adjust and assign the advertising budget to each of the users to maximize the user influence of the consumer products. In implementations, the influence maximization module iteratively determining the resource allocation for each of the users for multi-item influence maximization is based on a mean-field approximation of an Ising model that accounts for both user influence by way of the social correspondence and multi-item influence by the user correspondence with the multiple items. The influence maximization module can also assign a variable portion of the resource allocation to any number of the users based on the social correspondence between the users to maximize the user influence of the multiple items. The quantity of the resource allocation is different between the multiple users, and the quantity differences of the resource allocation reflects the different levels of user influence on the multiple items by the users.

BRIEF DESCRIPTION OF THE DRAWINGS

Implementations of multi-item influence maximization are described with reference to the following Figures. The same numbers may be used throughout to reference similar features and components that are shown in the Figures.

DETAILED DESCRIPTION

Figure 1:
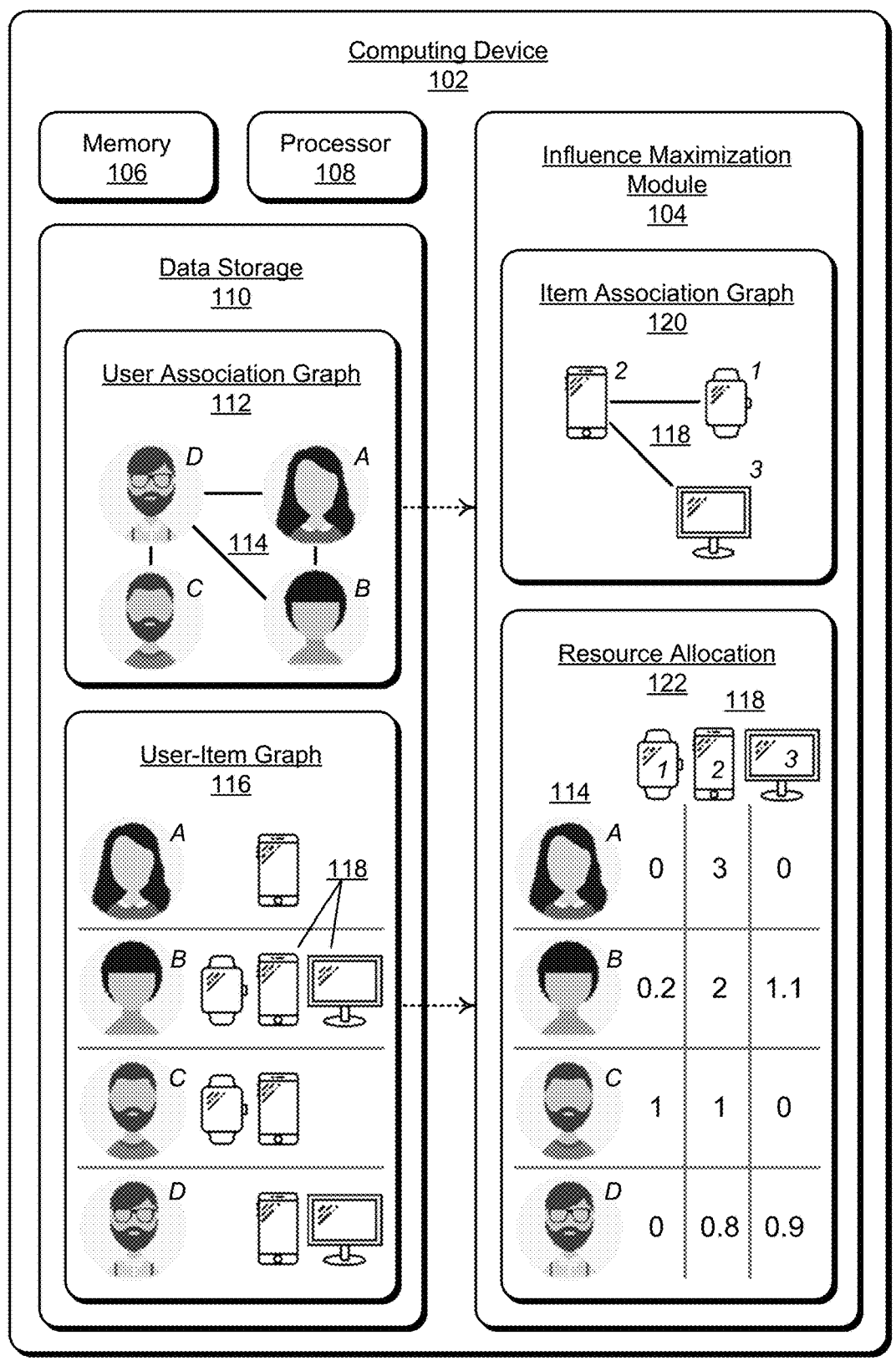
FIG. 1 illustrates an example environment in which aspects of multi-item influence maximization can be implemented.

Implementations of multi-item influence maximization are described, and provide for a continuous evaluation of influence maximization given a budget or resources, and allocating the budget or resources to any number of users in any arbitrary way such that the spread of influence by the users is maximized in the context of social correspondence between the users. This is in contrast to the traditional influence maximization problem, where the goal is to select a small subset of users who are determined as the social influencers most likely to promote or influence an item, and who maximize the spread of influence given an equally portioned allocation of the budget or resources. As described herein, a social network is generally referred to in the broad context of social correspondence between users, which may include any type of online social friendships, relationships, and/or communications, to include text messages, emails, online affirmations (e.g., "likes" or "retweets"), or any other types of direct or indirect social interactions.

The implementations described herein also provide for multi-item influence maximization in the context of heterogeneous networks, where the nodes of a heterogeneous network can be of different types. For example, users may connect to other users based on social associations, and may also correspond to multiple, different items that they have purchased, reviewed, endorsed, etc. The multi-item influence maximization problem can be formulated to allocate a budget or resources in a continuous fashion to maximize the spread of influence in a social and item network across all of the items simultaneously. In implementations, this multi-item influence maximization problem can be solved utilizing an Ising model, which is a well-known mathematical model that can be used for statistical analysis. The multi-item influence maximization can be based on the mean-field approximation of the Ising model, and the solution effectively maximizes the total purchase of multiple items by taking the social influence as well as item influence into account, which improves the total purchase achieved by the promoted items.

Aspects of multi-item influence maximization as described in the context of social correspondence can be implemented for real-world applications, such as for viral marketing and online advertising. The influence maximization problem can be considered in the context of a continuous setting, with a goal to determine how much incentive an advertiser should offer to each user in a social context such that the total spread of influence will be maximized according to a diffusion model. Generally, a product owner or advertiser may promote multiple items simultaneously, and the influence diffusion can represent both the social influence between users as well as item correspondence between multiple, different items. Notably, the multi-item influence maximization can utilize the Ising model for influence diffusion of multiple items with the goal to maximize the total purchase by users towards all items. As described herein, a mean-field approximation of an Ising model can be implemented to effectively maximize the total purchase of multiple items by taking social influence as well as item influence into account to improve the overall purchases of the promoted items.

As noted above, conventional techniques of influence maximization tend to focus on maximizing the user coverage of only one product or item by way of the social correspondence between users, and an equal portion of the budget or resources is allocated to only a small subset of social influencers who are most likely to promote or influence the single product or item. However, a company or advertiser may want to promote multiple items via any number of users so that the spread of influence by the users is maximized in the context of the social correspondence between users. When multiple, different items (e.g., products, viewpoints, marketing promotions, or any other promotable entities or concepts), are promoted simultaneously, the different items may be interdependent and a user who already has a tendency to be persuaded may be allocated less resources than a user who receives little positive influence from his/her friends or item influence. For a promotion of multiple products, the goal of using multi-item influence maximization is to entice more purchases of all the promoted products across a social network by way of the online social friendships, relationships, communications, and/or interactions between the users. With a limited advertising budget or resources, the company or advertiser can determine exactly how much of the budget or resources should be allocated to each user for each item, without overspending on those that are already likely to be persuaded.

The techniques of multi-item influence maximization described herein provide an influence diffusion system to capture both the interaction between users as well as the interaction between items. The techniques are applicable for many real-world applications, such as in viral marketing, online budget allocation, online advertisements, online bidding and advertisement placement, online recommendation-based applications, and the like. The techniques are also applicable for real-time advertisements and bidding where customers have a finite budget, and the budget is to be allocated in a continuous fashion to maximize the benefit and/or gain. In terms of viral marketing and related applications, multi-item influence maximization can be used to determine which users to target, and how much of the resources or budget should be allocated to each of the users. The techniques described herein for multi-item influence maximization can be used for such applications to allocate a budget or other resources in a continuous fashion, rather than the discrete allocation to just a few of the users who are determined to have the most likely social influence as the small subset of nodes in a social graph or network, as with the conventional approach to solving influence maximization.

In aspects of multi-item influence maximization, a computing device can receive and maintain data in the form of updated graphs, from which multi-item influence maximization can be solved for a budget or other resources in an iterative, continuous manner. The computing device can obtain or receive updates to a user association graph, and subsequent updated user association graphs, that indicate social correspondence between users. The computing device can also obtain or receive updates to a user-item graph, and subsequent updated user-item graphs, that indicate user correspondence with one or more items.

As used herein, a "user association graph" includes multiple users as graph nodes who are associated by any type of social connection, social influence, social relationship, communication relation, online interaction, or network association between members and groups in the context of one or more social correspondence, such as for advertising and marketing analytics. Notably, a user association graph represents any type of social correspondence (e.g., in a social network) and the user associations can continuously evolve and change over time. Generally, the associations between the users may be represented as any form of associations, functions, communications, co-locations, shared interests, or many other explicit or implicit relationships. A user association graph may also be referred to herein as a user-user association graph, or as a social graph that represents a social network. The concept of a social network is also described below in the context of mathematical terms, as implemented by an influence maximization module.

Further, as used herein, a "user-item graph" indicates user correspondence with one or more various items, and the user-item graph includes multiple, different items that are associated with or correspond to different users. As used herein, an "item" can be any type of consumer product, device, viewpoint, marketing promotion, or any other promotable entity or concept. Generally, a user is associated with or corresponds to an item in a user-item graph if the user owns, uses, expresses, or has some other connection to an item. Notably, two users may not have a social correspondence, but they may have a co-occurrence of one or more items. A user-item graph may also be referred to as a user-item association graph, or a user-by-item graph, that indicates how each user corresponds to one or more items, and from which an item association graph can be derived and/or updated.

The computing device implements the influence maximization module that can receive a user association graph and a user-item graph as data inputs, and then derive and/or update an item association graph, which indicates item correspondence of each item with one or more other items. As used herein, an "item association graph" indicates items that likely have a co-occurrence or have been co-purchased by one or more users. The item association graph can be derived and/or updated based on the user-item graph that indicates user correspondence of multiple users with one or more of the items. An item association graph may also be referred to as an item-item association graph, or an item graph that represents an item network. The concept of an item network is also described below in the context of mathematical terms, as implemented by the influence maximization module. The influence maximization module can then iteratively determine a resource allocation for each of the users to maximize user influence of multiple items that are associated in the item association graph and based on the social correspondence between the users.

For example, the items may be consumer products, and the resource allocation is an advertising budget that is allocated to the users to promote the consumer products. The influence maximization module can continuously adjust and assign the advertising budget to each of the users to maximize the user influence of the consumer products. In implementations, the influence maximization module iteratively determining the resource allocation for each of the users for the multi-item influence maximization is based on a mean-field approximation of an Ising model that accounts for both user influence by way of the social correspondence and multi-item influence by the user correspondence with the multiple items. The techniques for multi-item influence maximization formalizes a multi-item Ising influence maximization problem (MIIM), where the process of influence diffusion includes multiple items and a goal to maximize the total purchases of users towards all items, taking into account the influence of social correspondence between the users as well as the item influence.

The influence maximization module implemented by the computing device can also assign a variable portion of the resource allocation to any number of the users based on the social correspondence between the users to maximize the user influence of the multiple items. The quantity of the resource allocation can be different between the multiple users, and the quantity differences of the resource allocation reflects the different levels of user influence on the multiple items by the users. Accordingly, some of the users who are identified in the user association graph may not have a user correspondence with any of the items, as indicated in the user-item graph, in which case, the influence maximization module may determine that the resource allocation is a zero allocation for a user who will not have influence on the multiple items and with other users. Generally, the term "resource" for resource allocation as used herein may be any type of online budget allocation, online advertising, online bidding and advertisement placement, online recommendation-based applications, and the like.

While features and concepts of multi-item influence maximization can be implemented in any number of different devices, systems, networks, environments, and/or configurations, implementations of multi-item influence maximization are described in the context of the following example devices, systems, and methods.

FIG. 1 illustrates an example environment 100 in which aspects of multi-item influence maximization can be implemented. The example environment 100 includes a computing device 102, which implements features of an influence maximization module 104, such as for a continuous evaluation of influence maximization given a budget or resources, and allocating the budget or resources to any number of users in any arbitrary way such that the spread of influence by the users is maximized in the context of social correspondence. The computing device 102 can be implemented as any type of computing device, client device, mobile phone, tablet device, communication, entertainment, gaming, media playback, and/or other type of electronic and/or computing device. In this example environment 100, the computing device 102 may include any number and combination of different components as further described with reference to the example device shown in FIG. 6. For example, the computing device 102 in this example includes memory 106 and a processor 108, as well as any type of data storage 110 that may be implemented as any suitable memory, memory device, or electronic data storage.

The computing device 102 implements the influence maximization module 104, which may be implemented as a module that includes independent processing, memory, and/or logic components functioning as a computing and/or electronic device integrated with the computing device 102. Alternatively or in addition, the influence maximization module 104 can be implemented in software, in hardware, or as a combination of software and hardware components. In this example, the influence maximization module 104 is implemented as a software application or modules, such as executable software instructions (e.g., computer-executable instructions) that are executable with a processing system (e.g., the processor 108) of the computing device 102 to implement the techniques of multi-item influence maximization. As a software application or module, the influence maximization module 104 can be stored on in memory of the device (e.g., the device memory 106), or in any other suitable memory device or electronic data storage implemented with the influence maximization module. Alternatively or in addition, the influence maximization module 104 may be implemented in firmware and/or at least partially in computer hardware. For example, at least part of the influence maximization module 104 may be executable by a computer processor, and/or at least part of the influence maximization module may be implemented in logic circuitry.

The computing device 102 can receive and maintain data in the form of updated graphs, from which multi-item influence maximization can be solved for a budget or other resources in an iterative, continuous manner. In this example, the data storage 110 maintains a user association graph 112 (and subsequent updated data for user association graphs) that indicates social correspondence between users. In this example, the user association graph 112 includes multiple users 114 (e.g., users A, B, C, D, . . . ) who are associated by any type of social connection, social influence, social relationship, communication relation, or network association between members and groups in the context of one or more social interactions, such as for advertising and marketing analytics. Notably, the user association graph 112 represents any type of general social networking and the user associations can continuously evolve and change over time.

Generally, the associations between the users may be represented as any form of associations, functions, communications, co-locations, shared interests, or many other explicit or implicit relationships. These associations between the users can be indicated as the edges or connections between the nodes in the user association graph 112, and the updates to the graph that are obtained or received may be the data corresponding to new and/or updated edges between the nodes, as well as removing stale edges that are no longer relevant, and removing nodes of the graph that represent users who no longer have a correspondence with other users. A user association graph 112 may also be referred to herein as a user-user association graph, or as a social graph that represents a social network. The concept of a social network is also described below in the context of mathematical terms, as implemented by the influence maximization module 104.

The data storage 110 also maintains a user-item graph 116 (and subsequent updated data for user-item graphs) that indicates user correspondence with one or more various items. Generally, a user is associated with or corresponds to an item 118 in the user-item graph 116 if the user owns, uses, or has some other connection to an item. In this example, the user-item graph 116 includes multiple, different items 118 (e.g., items 1, 2, 3, . . . ) that are associated with or correspond to different users 114. Although shown as the same users A-D as indicated in the user association graph 112, the multiple, different items 118 may also be associated with or correspond to different users than those included in the user association graph. Notably, two users may not have a social correspondence, but they may have a co-occurrence of one or more items. Generally, a user correspondence with the item can be indicated as the edges or connections between the nodes in the user-item graph 116, and the updates to the graph that are obtained or received may be the data corresponding to new and/or updated edges between the nodes, as well as removing stale edges that are no longer relevant. A user-item graph 116 may also be referred to as a user-item association graph, or as a user-by-item graph, that indicates how each user corresponds to one or more of the items 118, and from which an item association graph 120 can be derived and/or updated.

In implementations, the influence maximization module 104 can receive the user association graph 112 (and subsequent updates to the user association graphs) and the user-item graph 116 (and subsequent updates to the user-item graphs) as data inputs, and then derive and/or update the item association graph 120, which indicates item correspondence of each item with one or more other items. For example, as determined from the user-item graph 116, users (e.g., users B and C) who have a smartwatch (item 1) likely also have a mobile phone (item 2), and generally, users (e.g., users B and D) who have a mobile phone (item 2) likely also have a display device (item 3). The item association graph 120 is an indication of the items that likely have a co-occurrence or have been co-purchased by one or more users. In implementations, the edges between the nodes in the item association graph 120 can be weighted. For instance, one weighting scheme would be to simply count the occurrences of each item-item association. An item association graph 120 may also be referred to as an item-item association graph, or as an item graph that represents an item network. The concept of an item network is also described below in the context of mathematical terms, as implemented by the influence maximization module 104.

The influence maximization module 104 is implemented to iteratively determine a resource allocation 122 for each of the users 114 to maximize user influence of multiple items 118 that are associated in the item association graph 120 and based on the social correspondence between the users, as indicated in the user association graph 112. For example, the items 118 (e.g., items 1, 2, 3, . . . ) may be consumer products, and the resource allocation is an advertising budget that is allocated to the users (e.g., users A, B, C, D, . . . ) to promote the consumer products. The influence maximization module 104 can account for both social influence based on the user association graph 112 and multi-item influence based on the item association graph 120, and can then continuously adjust and assign the advertising budget to each of the users to maximize the user influence of the consumer products.

In implementations, the influence maximization module 104 can determine and assign a variable portion of the resource allocation 122 to any number of the users 114 based on the social correspondence between the users to maximize the user influence of the multiple items. Notably, the quantity of the resource allocation 122 can be different between the multiple users, and the quantity differences of the resource allocation reflects the different levels of user influence on the multiple items by the users. Accordingly, some of the users who are identified in the user association graph 112 may not have a user correspondence with some or any of the items, as indicated in the user-item graph 116, in which case, the influence maximization module 104 may determine that the resource allocation 122 is a zero allocation for a particular user who will not have influence on the multiple items and with other users.

In this example, the resource allocation 122 shows a distribution given a budget of ten units (e.g., $10.00, $1,000.00, . . . etc.). User A is assigned three (3) units for social influence of the mobile phone (item 2) based on a determination of multi-item influence maximization in the context of user A and the multiple items to be promoted. As noted in the user-item graph 116, user A is associated with (e.g., owns or uses) a mobile phone, but is not associated with a smartwatch (item 1) or a display device (item 3). Accordingly, the resource allocation 122 is assigned as a zero allocation for user A who will likely not have influence with the other users for the smartwatch (item 1) or display device (item 3). Similarly, the resource allocation 122 is assigned to the other users B-D based on item correspondence and likely social influence for optimal distribution.

In implementations, the influence maximization module 104 can iteratively determine the resource allocation 122 for each of the users 114 for the multi-item influence maximization based on a mean-field approximation of an Ising model that accounts for both the user influence by way of the social correspondence and multi-item influence by user correspondence with the multiple items. Notably, a multi-item Ising influence maximization (MIIM) problem can be solved using a mean-field approximation, or other techniques. Generally, a user may be influenced to buy or use an item based on the action of the user's social neighbors towards the same item and purchases of other related items, while at the same time, the user action will result in some influence back on other user-item combinations.

The purchase or user actions between users and items are variable and a goal is to maximize the possibility of the actions being positive (persuaded). Additionally, there are external influences, such as user preferences, which is referred to or denoted as original bias that is likely not changed in the process. Another external influence for example, is an advertising promotion assigned as a resource allocation, which is decided by a product owner or advertiser to reduce the cost of the purchase action. This dynamic equilibrium can be modeled by an Ising network, and the goal of the MIIM problem is to assign a fraction of a total budget to every user in a market for every item promoted, so as to maximize the total expected purchase in a dynamical system (i.e., an Ising system).

The concept of a continuous budget is a challenge of the MIIM problem due to the unequal demand of users to be persuaded. Conventional techniques for influence maximization assume that all users in a social context have identical requirements for being seed users. Also, once selected as a seed node, a user will adopt the item for sure, acting as a key opinion leader in the marketing strategy. However, in the influence maximization under Ising model, users will be more likely to be persuaded with a larger budget assigned, but all the actions remain variable and the equilibrium is shifted according to the interactions in the network and external influence factors. In this case, users are appropriately promoted with an exact, determined budget distribution.

Another challenge of the MIIM problem comes from a product owner or advertiser who seeks to promote multiple items in a market together at the same time. If a user decides to purchase or otherwise interact with an item, he or she will have a higher probability to also acquire other items related to that that item brand or function. Some items will be more likely to be purchased together, as represented in the item association graph 120. Similar to the social influence taken into account from the social graphs (e.g., the user association graph 112), not taking into account the interactions between items can be wasteful of the budget that is allocated or assigned to a user-item pair and lower the total purchase. The multi-item diffusion model can simulate the propagation of influence with multiple items. Notably, the MIIM problem described herein models the interaction between users and items by an Ising model, and determines a budget plan that assigns the specific budget to every user-item pair. The number of these user-item combinations can be large and makes the problem more challenging.

As described above, the user association graph 112 indicates the social correspondence between users, generally in a social network referred to in the broad context of social correspondence between users, which may include any type of online social friendships, relationships, communications, and/or other types of online social interactions. In context of the influence maximization module 104, an online social network can be represented as a social graph $G_s(V_s,E_s,W)$, where nodes $V_s=\{u_1, \ldots, u_n\}$ is the set of users, $E_s$ is the set of social links among users in $V_s$ and $W=\{w_{ij}|i=1, \ldots, n; j=1, \ldots, n\}$ is the set of link weights. In the social network, for any item $i_p$, if $w_{ij}>0$, then with the strength of $|w_{ij}|$, $u_i$ has a tendency to take the same action as $u_j$, otherwise they tend to act differently.

Further, as described above, the item association graph 120 (e.g., an item network) indicates item correspondence of each item with one or more other items. In context of the influence maximization module 104, an item network can be represented as an item graph $G_i(V_i,E_i,S)$, where nodes $V_i=\{i_1, \ldots, i_m\}$ is the set of items, $E_i$ is the set of relation links among items in $V_i$ and $S=\{s_{pq}|p=1, \ldots, m; q=1, \ldots, m\}$ is the set of link weights. In the item network, for any user $u_i$, if $s_{pq}>0$, then the user is more likely to take item $i_p$ with a strength of $|s_{pq}|$ when item $i_q$ has been taken, otherwise two items will be less likely to be purchased by the same user.

The resource allocation 122 (also referred to herein as a budget plan) indicates the exact budget to assign each user, which can be represented as budget plan $\mathcal{H} \in \mathbb{R}_{\geq 0}^{n \times m}$, where $h_{ip}$ defines the budget that is assigned to $u_i$ for item $i_p$, and $\Sigma_{i,p} h_{ip} \leq h$. The budget plan has a limited budget constraint h. Additionally, an expected total purchase can be denoted as to whether a user $u_i$ takes an item $i_p$ as a node with value $\sigma_{ip} \in [-1, +1]$. Under some configurations, the value of any node $\sigma_{ip}$ can change according to a certain probability which is determined by all the influence it receives. The $\langle \sigma_{ip} \rangle$ is used to present an average value of $\sigma_{ip}$ over dynamics in the model, $M=\Sigma_{i,p} \langle \sigma_{ip} \rangle$ is the expected total purchase (influence) wanting to maximize.

In the context of the influence maximization module 104, the Ising model ($\mathcal{J}$,b,β) consists of N nodes, whose value σ can only take the values +1 or −1. Each node interacts with neighbors according to $\mathcal{J} \in \mathbb{R}^{N \times N}$ as well as an external field $b \in \mathbb{R}^N$. Then $J_{tk}$ represents the influence that node k holds over node t and $b_t$ denotes the external field (force) that node t has. A configuration $\sigma=\{\sigma_1, \ldots, \sigma_N\}$ has an energy function in EQ1:

$$\mathcal{H}(\sigma) = -\sum_{(t,k)} \mathcal{J}_{tk}\sigma_t\sigma_k - \sum_t b_t \sigma_t$$

which defines the probability of configuration a in EQ2 and EQ3:

$$P_\beta(\sigma) = \frac{e^{-\beta \mathcal{H}(\sigma)}}{Z_\beta}$$

$$Z_\beta = \sum_{all\,possible\,\sigma} e^{-\beta \mathcal{H}(\sigma)}$$

where β denotes the interaction strength of the system which is inversely proportional to the temperature. When β is large (low temperature), the configurations are near the one where all nodes are +1 or −1. If β is close to zero (high temperature), all configurations have an equal probability. The expected magnetization of the model is as in EQ4:

$$M(b) = \sum_t \langle \sigma_t \rangle$$

For a node t, its energy function and corresponding probability of $\sigma_t=+1$ is as in EQ5 and EQ6:

$$\mathcal{H}(\sigma_t) = -\left(\sum_k \mathcal{J}_{tk}\sigma_k + b_t\right)\sigma_t$$

$$P_\beta(\sigma_t = +1) = \frac{e^{-\beta \mathcal{H}(\sigma_t)}}{\Sigma_{\sigma_t'=\pm 1} e^{-\beta \mathcal{H}(\sigma_t')}}$$

In the context of multi-item Ising influence maximization, given a social network $G_s$, an item network $G_i$, interaction strength β, the fixed bias $\mathcal{B}^{n*m} \in \mathbb{R}^{n \times m}$ and a budget h, the goal of MIIM is to find a budget plan $\mathcal{H} \in \mathbb{R}_{\geq 0}^{n*m}$ to maximize the expected total purchase M:

$$\mathcal{H}^* = \underset{H}{\operatorname{argmax}} M(\mathcal{H} + B)$$

$$\text{s.t.} \sum_{i,p} h_{ip} \leq h \quad i = 1, \ldots, m; \, p = 1, \ldots, n$$

where the constraint indicates that the total amount of the overall budget has to be less than the amount of budget that is allocated.

Similar to a node in an Ising model, $\sigma_{ip}$ denotes a user-item action with value +1 (buy) or −1 (not buy). Its energy function is defined as in EQ7:

$$\mathcal{H}(\sigma_{ip}) = -\left(\sum_j w_{ij}\sigma_{jp} + h_{ip} + b_{ip} + \lambda \sum_q s_{pq}\sigma_{iq}\right)\sigma_{ip}$$

where $\lambda$ is a given parameter that controls the relative scale of item influence compared to the social influence. The first summation over j of the social graph is for a node i, where w represents the neighboring nodes j to the node i. The second summation over q of the item graph is for an item p. The expected total purchase is then defined as in EQ8:

$$M(\mathcal{H} + \mathcal{B}) = \sum_{i,p} \langle \sigma_{ip} \rangle$$

For simplicity, a hyper parameter $\lambda=1$ can be set, and $\mathcal{B}$ represents the long-term personal preferences that do not tune. Together with the adjustable budget $\mathcal{H}$, they are the external fields rather than the internal influence brought by the neighbor nodes, and a node in the model represents whether a user buys an item instead of the activity of a user. A user-item action ($\sigma_{ip}$) is influenced by the internal influence from social neighbors ($\Sigma_j w_{ij}\sigma_{ip}$) and other items ($\Sigma_q s_{pq}\sigma_{iq}$) as well as the external influence including personal preferences ($b_{ip}$) and promotion ($h_{ip}$). Therefore, the problem is defined like an Ising model, by replacing EQ5 with EQ7 to calculate the probability of each configuration.

Many of the notations used herein are summarized as follows:

As noted above, the influence maximization module 104 can implement multi-item influence maximization based on mean-field approximation of the Ising model, and the solution effectively maximizes the total purchase of multiple items by taking social influence as well as item influence into account, which improves the total purchase achieved by the promoted items. The method based on mean-field approximation of the Ising model is referred to herein as the "mMF" (mean-field for multiple items) method. By explicitly exploiting the social graph and the item graph, the mMF method can effectively find a feasible budget plan to maximize the total expected purchase. Another mean-field approach to the MIIM problem is an alternative method "sMF" (separate mean-field approximation) that applies the mean-field approximation separately for efficiency.

Given an Ising model, it may not be feasible to perform an exact enumeration on all possible configurations to calculate the expectations. From EQ5 above, the effective influence received by a specific node consists of the external field plus an interaction with its neighboring nodes. If the correlations of the neighboring nodes are approximately neglected and replaced by their average value, the self-consistency EQ9 can be obtained:

$$m_t = \tanh\left[\beta\left(\sum_k \mathcal{J}_{tk} m_k + b_t\right)\right]$$

where $m_t$ represents the expectation value $\langle \sigma_t \rangle$. A gradient ascent algorithm can then be applied as follows in Algorithm1 to approximate an optimal external field b with sufficient conditions:

---

Algorithm 1 Gradient ascent algorithm for Mean-Field approximation (MF)

Input: matrix of network $\mathcal{J}$, interaction strength $\beta$, constraint h
Output: external field b that approximates b*
1: initialize a feasible external field b, stop condition $\epsilon$, step size $\alpha$
2: repeat
3:  $M_{mf}(b) \leftarrow \Sigma_t m_t(b)$
4:  calculate the gradient $\nabla_b M_{mf}$
5:  $b_{new} \leftarrow F_{projection}$ on $h(b + a\nabla_b M_{mf})$
6:  $b \leftarrow b_{new}$
7: until $M_{mf}(b_{new}) - M_{mf}(b) \leq \epsilon$
8: $b \leftarrow b_{new}$
9: Return b

---

The mMF (mean-field for multiple items) method can be utilized by the influence maximization module 104 to solve the MIIM problem. The mMF method can be implemented to represent the complex MIIM model with a simple Ising

| Symbol | Definition |
| --- | --- |
| $\mathcal{V}_s = \{u_1, \ldots, u_n\}$ | the set of nodes in a social network $G_s$ |
| $\mathcal{V}_i = \{i_1, \ldots, i_m\}$ | the set of nodes in an item network $G_i$ |
| $\mathcal{W} = \{w_{ij} | i = 1, \ldots, n; j = 1, \ldots, n\}$ | the set of link weights of social network $G_s$ |
| $S = \{s_{pq} | p = 1, \ldots, m; q = 1, \ldots, m\}$ | the set of link weights of item network $G_i$ |
| $\mathcal{J} = \{j_{tk} | t = 1, \ldots, N; k = 1, \ldots, N\}$ | the set of link weights of an Ising network |
| $\mathcal{H} = \{h_{ip} | i = 1, \ldots, n; p = 1, \ldots, m\}$ | the set of all the variables $h_{ip}$ for the budget assigned to item $i_p$ for user $u_i$, $h_{ip} \geq 0$ and $\Sigma_{i,p} h_{ip} \leq h$ |
| $\mathcal{B} = \{b_{ip} | i = 1, \ldots, n; p = 1, \ldots, m\}$ | the set of all the values $b_{ip}$ for the bias that user $u_i$ holds over item $i_p$ |
| $b = \{b_1, \ldots, b_N\}$ | the vector of external field in an Ising model |
| $\sigma = \{\sigma_1, \ldots, \sigma_N\}$ | the vector of variables for a configuration in an Ising model, and $\sigma \in \{1, -1\}$ |
| $\beta$ | the value of interaction strength in an Ising model |
| h | the value of budget constraint |
| $\sigma_{ip}$ | the variable for the actions user $u_i$ takes towards item $i_p$, and $\sigma_{ip} \in \{1, -1\}$ | model so that the mean-field approximation can be applied on it as follows in Algorithm2:

---
Algorithm 2 multi-item Mean-Field approximation (mMF)

Input: social network $G_s$, item network $G_i$, fixed bias $\mathcal{B}$, interaction strength $\beta$, budget constraint h
Output: budget $\mathcal{H}$ that approximates $\mathcal{H}*$
  1: $\mathcal{J} \leftarrow F_{combine}(G_s, G_i)$
  2: $b \leftarrow MF(\mathcal{J}, \beta, h)$
  3: $\mathcal{H} \leftarrow F_{reshape}(b)$
  4: Return $\mathcal{H}$

---

Initially, the matrix representation is flattened, and $\sigma_{ip}$ is taken as $\sigma_t$, where $t=i*m+p$ and m is the size of the item network $G_i$. The fixed bias $b_{ip}$ from $\beta$ is just part of the external field, together with the adjustable budget $h_{ip}$ of $\mathcal{H}$, for $b_t = b_{ip} + h_{ip}$. To simplify the description, the extra bias $\beta=0$ is assumed. The MIIM problem has a slightly different energy function. However, the internal influence still consists of social influence and item influence, and the two networks are similarly combined into a new graph $\mathcal{J}$:

$$\mathcal{J}_{tk} = w_{tk} + s_{tk}\ t = i*m+p, k = j*m+q$$

$$w_{tk} = w_{ij}\ \text{if}\ i \neq j\ \text{and}\ p = q$$

$$s_{tk} = s_{pq}\ \text{if}\ i = j\ \text{and}\ p \neq q$$

Therefore, from EQ9 above, EQ10:

$$m_t = m_{ip} = \tanh\left[\beta\left(\sum_j w_{ij} m_{jp} + \sum_q s_{pq} m_{iq} + h_{ip}\right)\right]$$

with mean-field approximation used to approximate the external field b* and reshape it into the budget plan $\mathcal{H}$ to solve the MIIM problem.

The mMF method translates the MIIM problem into a normal Ising model with N nodes, where N is the product of number of users in a social network n and the number of items in an item network m. Therefore, the efficiency can become a limitation with a large scale, combined network. Here, the sMF (separate mean-field approximation) method is an alternative to improve the efficiency. Instead of generating a large combined network, the sMF method takes the social network and the item network as two independent graphs using the Ising model. This is shown in Algorithm3:

---
Algorithm 3 separate Mean-Field approximation (sMF)

Input: social network $G_s$, item network $G_i$, fixed bias $\mathcal{B}$, interaction strength $\beta$, budget constraint h
Output: budget $\mathcal{H}$ that approximates $\mathcal{H}*$
  1: $b \leftarrow MF(\mathcal{W}, \beta, h)$
  2: for $h_i = b_i$, $i = 1 \rightarrow n$ do
  3: $\mathcal{H}_{ith\ row} \leftarrow MF(S, \beta, h_i)$
  4: Return $\mathcal{H}$

---

The mean-field approximation is first applied on the social graph with total budget h to determine the budget assignment for users b, then for each user, the mean-field approximation is applied on the item graph with a different sub budget $b_i$ to determine the budget h of each user-item pair for the final budget plan $\mathcal{H}$. Although the method does not simulate the simultaneous interaction between users and items, it still considers both kinds of influence and transfers the social influence to the item interaction process by controlling the sub budget for each user. An alternative version of this method is to assign the budget based on the item graph first, rather than on the social graph.

Figure 2:
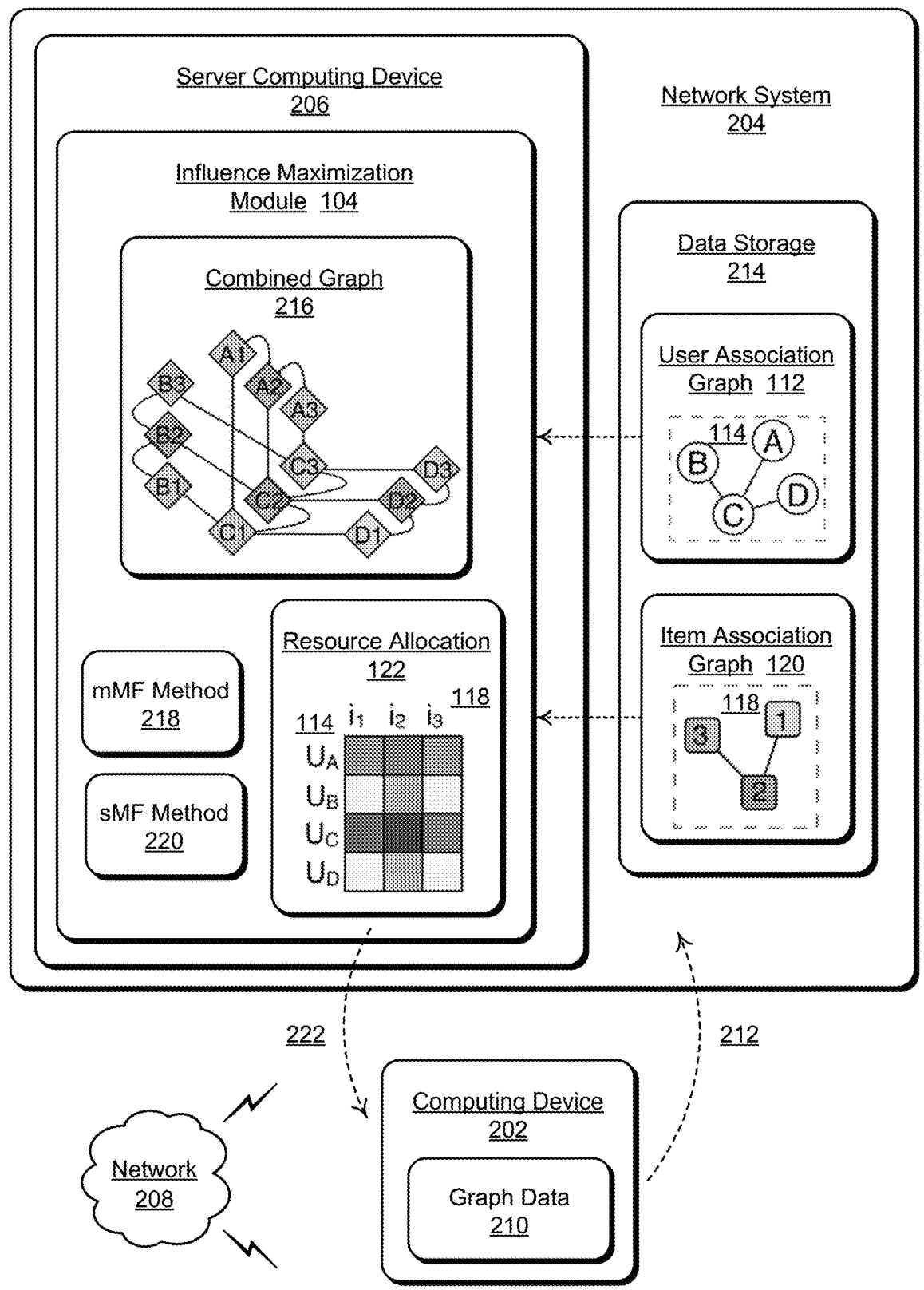
FIG. 2 illustrates another example environment in which aspects of multi-item influence maximization can be implemented.

FIG. 2 illustrates another example environment 200 in which aspects of multi-item influence maximization can be implemented. The example environment 200 includes a computing device 202 and a network system 204, which implements features of the influence maximization module 104. The computing device 202 can be implemented as any type of computing device described herein, such as the computing device 102 shown and described with reference to FIG. 1. In this example environment 200, the computing device 202 may include any number and combination of different components as further described with reference to the example device shown in FIG. 6, and is implemented to access and communicate with a server computing device 206 of the network system 204, such as via a communication network 208.

A user of the computing device 202 may upload graph data 210 to the network system 204, where the graph data 210 may be the user association graph 112, the user-item graph 116, the item association graph 120, or any other type of graph data that may be utilized and/or generated by the influence maximization module 104. The network system 204 can receive the uploaded graph data 210 as an input to the influence maximization module 104 from the computing device 202, as indicated at 212 via the network 208.

Any of the devices, servers, and/or services described herein can communicate via the network 208, such as for data communication between the computing device 202 and the network system 204. The network 208 can be implemented to include a wired and/or a wireless network. The network can also be implemented using any type of network topology and/or communication protocol, and can be represented or otherwise implemented as a combination of two or more networks, to include IP-based networks and/or the Internet. The network 208 may also include mobile operator networks that are managed by a mobile network operator and/or other network operators, such as a communication service provider, mobile phone provider, and/or Internet service provider.

In this example environment 200, the network system 204 is representative of any number of cloud-based access sites that provide a service and/or from which data and information is available, such as via the Internet, for online and/or network-based access. The network system 204 can be accessed online, and includes the server computing device 206, which is representative of one or more hardware server devices (e.g., computing devices) that may be implemented at the network system. Generally, the server computing device 206 includes memory and a processor, and may also include any number and combination of different components as further described with reference to the example device shown in FIG. 6.

In this example environment 200, the server computing device 206 implements the influence maximization module 104, such as in software, in hardware, or as a combination of software and hardware components, generally as shown and described with reference to FIG. 1. In this example, the influence maximization module 104 is implemented as a software application or modules, such as executable software instructions (e.g., computer-executable instructions) that are executable with a processing system of the server computing device 206 to implement the techniques of multi-item influence maximization. The influence maximization module 104 can be stored on computer-readable storage media, such as any suitable memory device (e.g., the device memory) or electronic data storage implemented in the server computing device 206 and/or at the network system 204.

The network system 204 may include multiple data storage, server devices, and applications, and can be implemented with various components as further described with reference to the example device shown in FIG. 6. The network system 204 also includes data storage 214 that may be implemented as any suitable memory, memory device, or electronic data storage for network-based data storage. The data storage 214 is utilized at the network system 204 to maintain the user association graph 112, the user-item graph 116, the item association graph 120, or any other type of graph data that may be utilized and/or generated by the influence maximization module 104, as shown and described with reference to FIG. 1.

In aspects of multi-item influence maximization, the influence maximization module 104 can receive the graph data 210, as uploaded from the computing device 202, such as in the form of the user association graph 112 and the item association graph 120. In this example, the influence maximization module 104 is implemented to generate a combined graph 216 that represents all of the different possibilities of user-item pairs derived from the user association graph 112 and the item association graph 120. In this example, the user association graph 112 includes multiple users 114 (e.g., users A, B, C, D, . . . ) who have a social correspondence between the users based on one or more types of general social interactions. The item association graph 120 includes multiple, different items 118 (e.g., items 1, 2, 3, . . . ) and indicates item correspondence of each item with one or more other items.

As described with reference to FIG. 1, the influence maximization module 104 is implemented to iteratively determine the resource allocation 122 for each of the users 114 to maximize user influence of multiple items 118 that are associated in the item association graph 120 and based on the social correspondence between the users, as indicated in the user association graph 112. For example, the items 118 (e.g., items 1, 2, 3, . . . ) may be consumer products, and the resource allocation is an advertising budget that is allocated to the users (e.g., users A, B, C, D, . . . ) to promote the consumer products. The influence maximization module 104 can account for both social influence based on the user association graph 112 and multi-item influence based on the item association graph 120, and can then continuously adjust and assign the advertising budget to each of the users to maximize the user influence of the consumer products.

The influence maximization module 104 can determine and assign a variable portion of the resource allocation 122 to any number of the users 114 based on the social correspondence between the users to maximize the user influence of the multiple items. Notably, the quantity of the resource allocation 122 can be different between the multiple users, and the quantity differences of the resource allocation reflects the different levels of user influence on the multiple items by the users. As described above, the influence maximization module 104 can implement an mMF (mean-field for multiple items) method 218 and/or an sMF (separate mean-field approximation) method 220 to iteratively determine the resource allocation 122 for each of the users 114 to maximize user influence of multiple items 118 that are associated in the item association graph 120 and based on the social correspondence between the users, as indicated in the user association graph 112. The computing device 202 can then receive back the resource allocation 122, as indicated at 222 via the network 208. Notably, the techniques for multi-item influence maximization described herein outperforms all other conventional methods by influencing more people to make more purchases.

Example methods 300, 400, and 500 are described with reference to respective FIGS. 3, 4, and 5 in accordance with one or more aspects of multi-item influence maximization. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
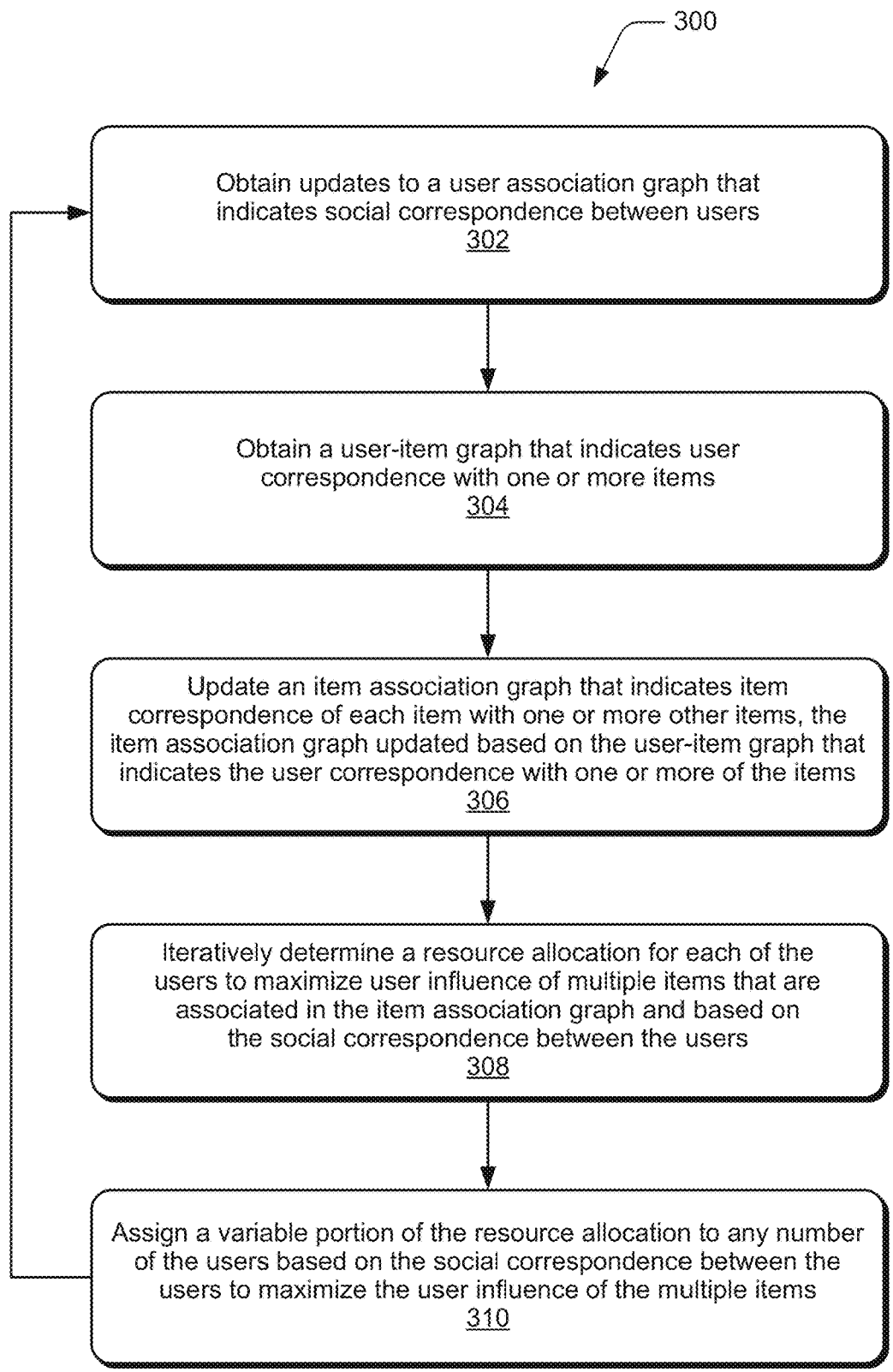
FIG. 3 illustrates an example method of multi-item influence maximization in accordance with one or more implementations.

FIG. 3 illustrates example method(s) 300 for multi-item influence maximization, and is generally described with reference to the influence maximization module implemented by a computing device as shown and described with reference to FIGS. 1-2. The order in which the method is described is not intended to be construed as a limitation, and any number or combination of the method operations can be combined in any order to implement a method, or an alternate method.

At 302, updates to a user association graph that indicates social correspondence between users are obtained. For example, the computing device 102 can obtain (or receive) and maintain updates to a user association graph 112 (and subsequent updated data for user association graphs) that indicates social correspondence between users. At 304, updates to a user-item graph that indicates user correspondence with one or more items are obtained. For example, the computing device 102 can obtain (or receive) and maintain updates to a user-item graph 116 (and subsequent updated data for user-item graphs) that indicates user correspondence with one or more various items.

At 306, an item association graph that indicates item correspondence of each item with one or more other items is updated, where the item association graph can be derived and/or updated based on the user-item graph that indicates the user correspondence with one or more of the items. For example, the influence maximization module 104 that is implemented by the computing device 102 can receive the user association graph 112 and the user-item graph 116 as data inputs (or receive updates to the user association graph 112 and the user-item graph 116), and then derive and/or update the item association graph 120, which indicates item correspondence of each item with one or more other items.

At 308, a resource allocation is iteratively determined for each of the users to maximize user influence of multiple items that are associated in the item association graph and based on the social correspondence between the users. For example, the influence maximization module 104 that is implemented by the computing device 102 can iteratively determine the resource allocation 122 for each of the users 114 to maximize user influence of multiple items 118 that are associated in the item association graph 120 and based on the social correspondence between the users, as indicated in the user association graph 112. In implementations, the items are consumer products, the resource allocation 122 is advertising budget allocated to the users 114 to promote the consumer products, and the advertising budget is continuously adjustable and assignable to each of the users to maximize the user influence of the consumer products. The influence maximization module 104 may also iteratively determine the resource allocation 122 for each of the users 114 for the multi-item influence maximization based on a mean-field approximation of an Ising model that accounts for both the user influence by way of the social correspondence and multi-item influence by the user correspondence with the multiple items.

At 310, a variable portion of the resource allocation is assigned to any number of the users based on the social correspondence between the users to maximize the user influence of the multiple items. For example, the influence maximization module 104 that is implemented by the computing device 102 can assign a variable portion of the resource allocation 122 to any number of the users 114 based on the social correspondence between the users to maximize the user influence of the multiple items. A quantity of the resource allocation 122 may be different for at least two of the users, and the quantity differences of the resource allocation reflect different levels of user influence on the multiple items by the users. Additionally, one or more of the users identified in the user association graph 112 may not have a user correspondence with one or more of the items 118, and the resource allocation is determined to be a zero allocation for a particular user who will not have influence on the multiple items and with other users. The method can then continue at 302 (and then 304) to obtain the updated graph data.

Figure 4:
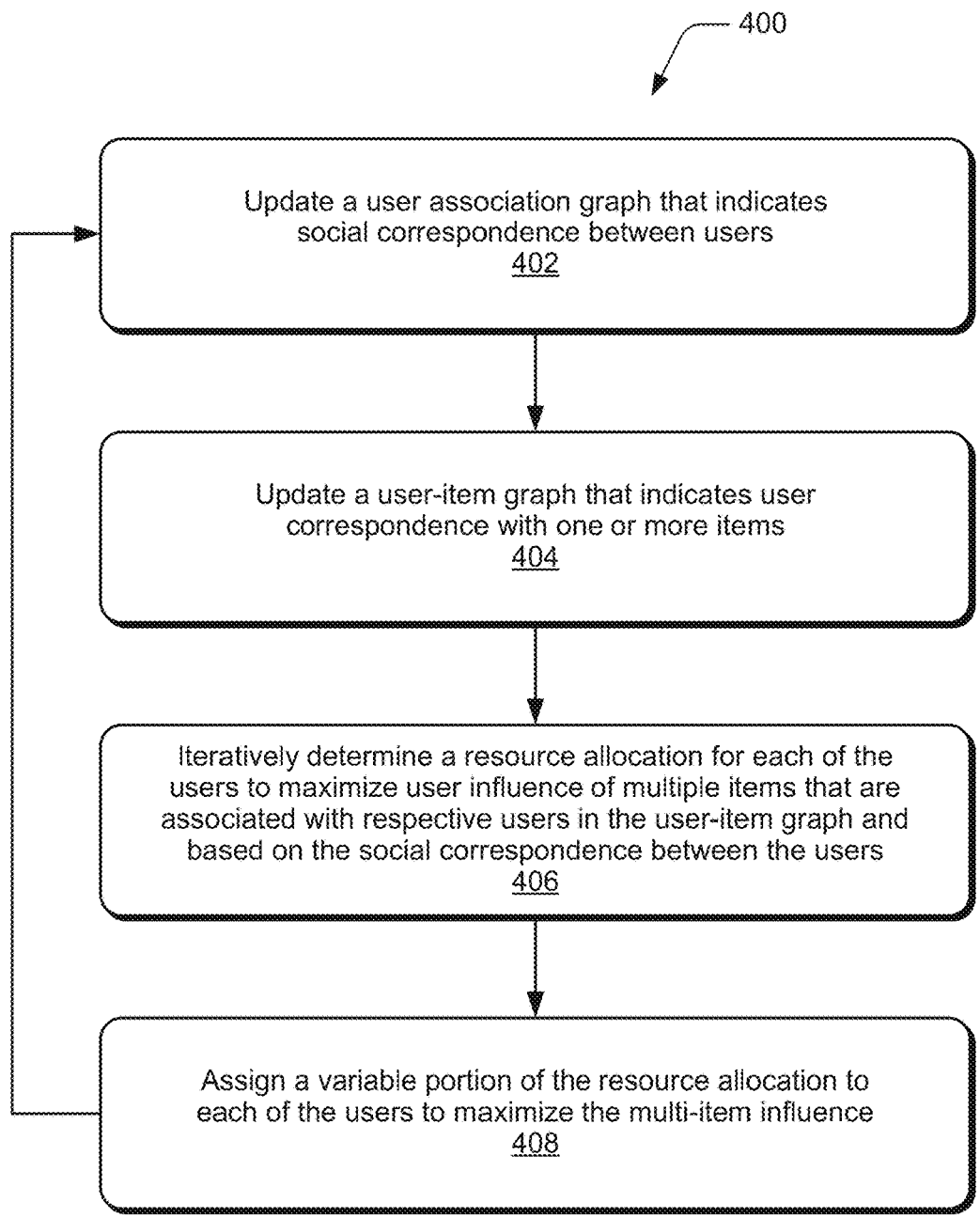
FIG. 4 illustrates another example method of multi-item influence maximization in accordance with one or more implementations.

FIG. 4 illustrates example method(s) 400 for multi-item influence maximization, and is generally described with reference to the influence maximization module implemented by a computing device as shown and described with reference to FIGS. 1-2. The order in which the method is described is not intended to be construed as a limitation, and any number or combination of the method operations can be combined in any order to implement a method, or an alternate method.

At 402, a user association graph that indicates social correspondence between users is updated. For example, the computing device 102 receives updates to a user association graph 112 (and subsequent updated data for user association graphs) that indicates social correspondence between users. At 404, a user-item graph that indicates user correspondence with one or more items is updated. For example, the computing device 102 receives updates to a user-item graph 116 (and subsequent updated data for user-item graphs) that indicates user correspondence with one or more various items.

At 406, a resource allocation for each of the users is iteratively determined to maximize user influence of multiple items that are associated with respective users in the user-item graph and based on the social correspondence between the users. For example, the influence maximization module 104 that is implemented by the computing device 102 can iteratively determine the resource allocation 122 for each of the users 114 to maximize user influence of multiple items 118 that are associated in the item association graph 120 and based on the social correspondence between the users, as indicated in the user association graph 112. As noted above, a quantity of the resource allocation 122 may be different for at least two of the users 114, where the quantity differences of the resource allocation are reflective of different levels of user influence on the multiple items 118 by the users. For example, the influence maximization module 104 can determine to allocate a zero portion of the resource allocation to at least one of the users who will not have influence on the multiple items or on other users. In implementations, the influence maximization module 104 can iteratively determine the resource allocation 122 for each of the users 114 for the multi-item influence maximization based on a mean-field approximation of an Ising model that accounts for both the user influence by way of the social correspondence and multi-item influence by the user correspondence with the multiple items.

At 408, a variable portion of the resource allocation is assigned to each of the users to maximize the multi-item influence. For example, the influence maximization module 104 that is implemented by the computing device 102 can assign the variable portion of the resource allocation 122 to each of the users 114 as a different quantity of the resource based on user influence and item correspondence with the user. The influence maximization module 104 can determine to assign the variable portion of the resource allocation to any number of the users 114 based on the social correspondence between the users to maximize the user influence of the multiple items 118. The method can then continue at 402, 404 to update the graph data.

Figure 5:
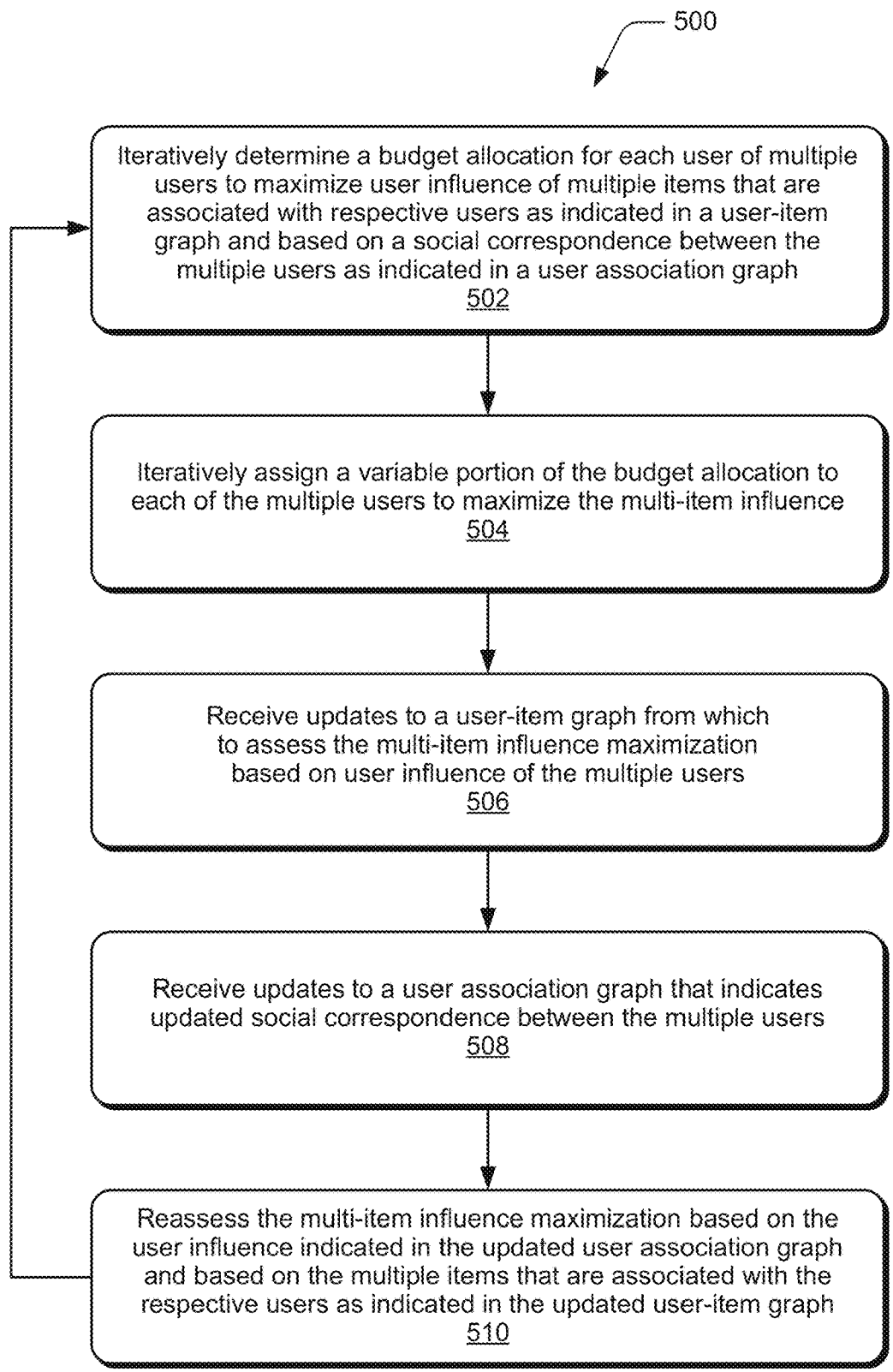
FIG. 5 illustrates another example method of multi-item influence maximization in accordance with one or more implementations.

FIG. 5 illustrates example method(s) 500 for multi-item influence maximization, and is generally described with reference to the influence maximization module implemented by a computing device as shown and described with reference to FIGS. 1-2. The order in which the method is described is not intended to be construed as a limitation, and any number or combination of the method operations can be combined in any order to implement a method, or an alternate method.

At 502, a budget allocation is iteratively determined for each user of multiple users to maximize user influence of multiple items that are associated with respective users as indicated in a user-item graph and based on a social correspondence between the multiple users as indicated in a user association graph. For example, the influence maximization module 104 that is implemented by the computing device 102 can iteratively determine the budget allocation for each of the users 114 to maximize user influence of multiple items 118 that are associated with respective users as indicated in the user association graph 112. In implementations, the items 118 are consumer products, the budget allocation is advertising budget allocated to the multiple users to promote the consumer products, and the advertising budget is continuously adjustable for allocation to each of the multiple users 114 to maximize the user influence of the consumer products. In implementations, the influence maximization module 104 can iteratively determine the budget allocation for each of the multiple users 114 for the multi-item influence maximization and is based on a mean-field approximation of an Ising model that accounts for both the user influence by way of the social correspondence and multi-item influence by user correspondence with the multiple items.

At 504, a variable portion of the budget allocation is iteratively assigned to each of the multiple users to maximize the multi-item influence. For example, the influence maximization module 104 that is implemented by the computing device 102 can iteratively assign a variable portion of the resource allocation 122 to any number of the users 114 to maximize the multi-item influence, such as based on the social correspondence between the multiple users to maximize the user influence of the multiple items. The quantity of the budget allocation can be different for at least two of the users, where the quantity differences of the budget allocation are reflective of different levels of user influence on the multiple items by the users. In implementations, at least one of the users identified in the user association graph 112 may not have user correspondence with the multiple items 118, and the budget allocation is determined to be a zero allocation for the particular user who will not have influence on the multiple items or on other users.

At 506, updates to a user-item graph are received from which to assess the multi-item influence maximization based on user influence of the multiple users. For example, the influence maximization module 104 implemented by the computing device 102 can receive updates to the user-item graph 116 from which to assess the multi-item influence maximization based on user influence of the multiple users. At 508, updates to a user association graph are received that indicate updated social correspondence between the multiple users. For example, the influence maximization module 104 implemented by the computing device 102 can receive updates to the user association graph 112 that indicate updated social correspondence between the multiple users.

At 510, the multi-item influence maximization is reassessed based on the user influence indicated in the updated user association graph and based on the multiple items that are associated with the respective users as indicated in the updated user-item graph. For example, the influence maximization module 104 that is implemented by the computing device 102 can reassess the multi-item influence maximization based on the user influence indicated in the updated user association graph 112 and based on the multiple items 118 that are associated with the respective users 114 as indicated in the updated user-item graph 116. The method can then continue at 502 to iteratively determine the budget allocation.

Figure 6:
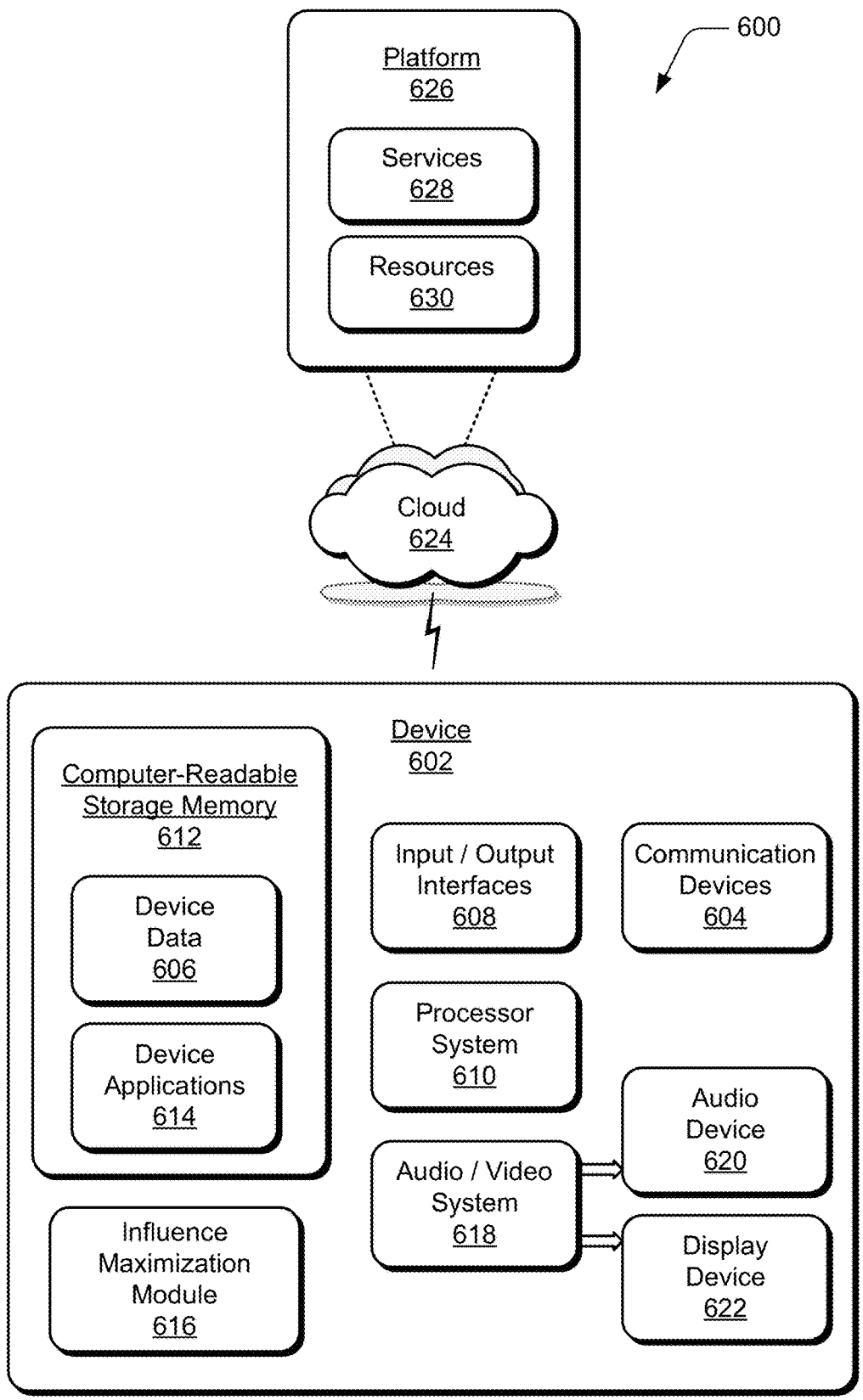
FIG. 6 illustrates an example system with an example device that can implement aspects of multi-item influence maximization.

FIG. 6 illustrates an example system 600 that includes an example device 602, which can implement techniques of multi-item influence maximization. The example device 602 can be implemented as any of the computing devices, mobile devices, server devices, and/or services described with reference to the previous FIGS. 1-5, such as any type of computing device, client device, mobile phone, tablet, communication, entertainment, gaming, media playback, and/or other type of device. For example, the computing device 102, the server computing device 206, and/or various server devices of the network system 204 may be implemented as the example device 602.

The example device 602 includes communication devices 604 that enable wired and/or wireless communication of device data 606, such as any of the graph data, as well as computer applications data and content that is transferred from one computing device to another, and/or synched between multiple computing devices. The device data 606 can include any type of audio, video, image, and/or graphic data that is generated by applications executing on the device. The communication devices 604 can also include transceivers for cellular phone communication and/or for network data communication.

The device 602 also includes input/output (I/O) interfaces 608, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 602. The I/O interfaces also include data input ports via which any type of data, media content, and/or inputs can be received, such as user inputs to the device, as well as any type of audio, video, and/or image data received from any content and/or data source.

The device 602 includes a processor system 610 that may be implemented at least partially in hardware, such as with any type of microprocessors, controllers, and the like that process executable instructions. The processor system 610 can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 602 may further include any type of a system bus or other data and command transfer system that couples the various components within the device. A system bus can include any one or combination of different bus structures and architectures, as well as control and data lines.

The example device 602 also includes computer-readable storage memory 612, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 612 can include various implementations of random access memory (RAM), read-only memory (ROM), flash memory, and other types of storage memory in various memory device configurations.

The computer-readable storage memory 612 provides storage of the device data 606 and various device applications 614, such as an operating system that is maintained as a software application with the computer-readable storage memory and executed by the processor system 610. In this example, the device 602 includes an influence maximization module 616 that implements the described techniques of multi-item influence maximization, and may be implemented with hardware components and/or in software as one of the device applications 614, such as when the example device 602 is implemented as the computing device 102 and/or the server computing device 206 shown in FIGS. 1 and 2. An example of the influence maximization module 616 includes the influence maximization module 104 that is implemented as a software application and/or as hardware components by the computing device 102, the server computing device 206, and/or by other various server devices of the network system 204, as described with reference to FIGS. 1-5. In implementations, the influence maximization module 616 may include independent processing, memory, and logic components as a computing and/or electronic device integrated with the device 602.

The device 602 also includes an audio and/or video system 618 that generates audio data for an audio device 620 and/or generates display data for a display device 622. The audio device and/or the display device include any devices that process, display, and/or otherwise render audio, video, display, and/or image data. In implementations, the audio device and/or the display device are integrated components of the example device 602. Alternatively, the audio device and/or the display device are external, peripheral components to the example device. In embodiments, at least part of the techniques described for multi-item influence maximization may be implemented in a distributed system, such as over a "cloud" 624 in a platform 626. The cloud 624 includes and/or is representative of the platform 626 for services 628 and/or resources 630. For example, the services 628 may include the network system 204 described with reference to FIG. 2.

The platform 626 abstracts underlying functionality of hardware, such as server devices (e.g., included in the services 628) and/or software resources (e.g., included as the resources 630), and connects the example device 602 with other devices, servers, etc. The resources 630 may also include applications and/or data that can be utilized while computer processing is executed on servers that are remote from the example device 602. Additionally, the services 628 and/or the resources 630 may facilitate subscriber network services, such as over the Internet, a cellular network, or Wi-Fi network. The platform 626 may also serve to abstract and scale resources to service a demand for the resources 630 that are implemented via the platform, such as in an interconnected device embodiment with functionality distributed throughout the system 600. For example, the functionality may be implemented in part at the example device 602 as well as via the platform 626 that abstracts the functionality of the cloud 624.

Although implementations of multi-item influence maximization have been described in language specific to features and/or methods, the appended claims are not necessarily limited to the specific features or methods described. Rather, the specific features and methods are disclosed as example implementations of multi-item influence maximization, and other equivalent features and methods are intended to be within the scope of the appended claims. Further, various different examples are described and it is to be appreciated that each described example can be implemented independently or in connection with one or more other described examples.

The invention claimed is:

1. In a digital environment for multi-item influence maximization, a method implemented by at least one computing device, the method comprising:
    obtaining updates to a user association graph that indicates social correspondence between users;
    obtaining updates to a user-item graph that indicates user correspondence with one or more items;
    updating an item-item association graph that indicates item correspondence of each respective item with one or more other items that are commonly owned or used with the respective item, the item-item association graph updated based on the obtained updates to the user-item graph that indicates the user correspondence with one or more of the items; and
    iteratively determining, using a separate mean-field approximation method, a resource allocation for each of the users with respect to each respective item of multiple items that are associated in the item-item association graph, the resource allocation for each of the users being determined by applying a mean-field approximation on the user association graph, a portion of the resource allocation to be allocated to each item of the multiple items being determined for each of the users by applying an additional mean-field approximation on the item-item association graph, the iteratively determining including:
        determining whether a respective user is likely to be influenced to perform an action with respect to the multiple items by distribution of the resource to a different user based on the social correspondence between the respective user and the different user indicated by the user association graph; and one of:
        reducing the resource allocation for the respective user based on determining that the respective user is likely to be influenced to perform the action by the distribution of the resource to the different user; or
        increasing the resource allocation for the respective user based on determining that the respective user is not likely to be influenced to perform the action by the distribution of the resource to the different user; and
    iteratively adjusting the resource allocation for each of the users based on the obtained updates to the user association graph and the item-item association graph updated according to the obtained updates to the user-item graph.

2. The method of claim 1, further comprising:
    assigning a variable portion of the resource allocation to any number of the users based on the social correspondence between the users to maximize the user influence of the multiple items.

3. The method of claim 1, wherein a quantity of the resource allocation is different for at least two of the users, the quantity differences of the resource allocation reflective of different levels of user influence on the multiple items by the at least two users.

4. The method of claim 1, wherein:
    at least one of the users identified in the user association graph does not have the user correspondence with the one or more items; and
    the resource allocation is determined to be a zero allocation for the at least one user who will not have influence on the multiple items.

5. The method of claim 1, wherein: the items are consumer products;
    the resource allocation is an advertising budget allocated to the users to promote the consumer products; and
    the advertising budget is iteratively adjustable for assigning the advertising budget to each of the users to maximize the user influence of the consumer products.

6. The method of claim 1, wherein a quantity of the resource allocation for a user is different for at least two items of the multiple items, the quantity differences of the resource allocation reflective of different levels of user influence on the at least two items by the user.

7. The method of claim 1, further comprising:
    providing multiple links between the users in the user association graph, each of the links comprising a weight that indicates how likely linked users are to perform a same action; and
    determining whether the respective user is likely to be influenced to perform the action with respect to the multiple items by distribution of the resource to the different user based on the weight of a link between the respective user and the different user.

8. The method of claim 1, the iteratively determining further including determining whether distribution of a first quantity of the resource allocation to the respective user which promotes a first item is likely to influence the respective user to perform an additional action with respect to a second item based on the item correspondence between the first item and the second item as indicated by the item-item association graph.

9. The method of claim 8, the iteratively determining further including reducing a second quantity of the resource allocation for the respective user which promotes the second item based on a determination that the distribution of the first quantity of the resource allocation which promotes the first item is likely to influence the action with respect to the second item.

10. A computing device implemented for multi-item influence maximization in a digital environment, the computing device comprising:
a memory to update and maintain a user association graph that indicates social correspondence between users, and a user-item graph that indicates user correspondence with one or more items;
a processor system configured to execute an influence maximization module implemented to:
update an item-item association graph that indicates item correspondence of multiple items with one or more other items that are commonly owned or used with a respective item of the multiple items, the item-item association graph updated based on updates to the user-item graph;
iteratively determine, using a separate mean-field approximation method, a resource allocation for each of the users with respect to each respective item of the multiple items that are associated in the item-item association graph, a mean-field approximation on the user association graph being applied to determine the resource allocation for each of the users, an additional mean-field approximation on the item-item association graph being applied to determine, for each of the users, a portion of the resource allocation to be allocated to each item of the multiple items, to iteratively determine the resource allocation for a respective user, the influence maximization module is further implemented to:
determine whether distribution of a first quantity of the resource allocation to the respective user which promotes a first item is likely to influence the respective user to perform an action with respect to a second item based on the item correspondence between the first item and the second item as indicated by the item-item association graph; and
reduce a second quantity of the resource allocation for the respective user which promotes the second item based on a determination that the distribution of the first quantity of the resource allocation which promotes the first item is likely to influence the action with respect to the second item;
iteratively adjust the resource allocation for each of the users based on updates to the user association graph and the item-item association graph updated according to the updates to the user-item graph; and
assign a variable portion of the resource allocation to each of the users to maximize the multi-item influence.

11. The computing device of claim 10, wherein the influence maximization module is implemented to assign the variable portion of the resource allocation to each of the users as a different quantity of the resource based on user influence and item correspondence with the user.

12. The computing device of claim 10, wherein the influence maximization module is implemented to assign the variable portion of the resource allocation to any number of the users based on the social correspondence between the users to maximize the user influence of the multiple items.

13. The computing device of claim 10, wherein a quantity of the resource allocation is different for at least two of the users, the quantity differences of the resource allocation reflective of different levels of user influence on the multiple items by the at least two users.

14. The computing device of claim 10, wherein the influence maximization module is implemented to allocate a zero portion of the resource allocation to at least one of the users who will not have influence on the multiple items.

15. The computing device of claim 10, wherein:
the items are consumer products;
the resource allocation is an advertising budget allocated to the users to promote the consumer products; and
the advertising budget is iteratively adjustable for assignment of the advertising budget to each of the users to maximize the user influence of the consumer products.

16. The computing device of claim 10, wherein the influence maximization module is implemented to:
provide links between the multiple items in the item-item association graph, each of the links comprising a weight that indicates how likely linked items are to be purchased together; and
determine whether the distribution of the first quantity of the resource allocation to the respective user which promotes the first item is likely to influence the respective user to perform the action with respect to the second item based on the weight of a link between the first item and the second item.

17. The computing device of claim 16, wherein the weight of the link between the first item and the second item is determined based on a number of occurrences of the first item and the second item being owned or purchased together by the users.

18. In a digital environment for multi-item influence maximization, a method implemented by at least one computing device, the method comprising:
receiving updates to a user association graph that indicates social correspondence between users;
updating an item-item association graph that indicates item correspondence of each respective item of multiple items with one or more other items that are commonly owned or used with the respective item, the item-item association graph updated based on user item graph user correspondence with the one or more items;
iteratively determining, using a separate mean-field approximation method, a budget allocation for each user of multiple users with respect to each respective item of the multiple items that are associated in the item-item association graph, the budget allocation for each of the users being determined by applying a mean-field approximation on the user association graph, a portion of the budget allocation to be allocated to each item of the multiple items being determined for each of the users by applying an additional mean-field approximation on the item-item association graph, the iteratively determining including:
determining whether a respective user is likely to be influenced to perform an action with respect to the multiple items by distribution of the budget to a different user based on the social correspondence between the respective user and the different user indicated by the user association graph; and one of:
reducing the budget allocation for the respective user based on determining that the respective user is likely to be influenced to perform the action by the distribution of the budget to the different user; or increasing the budget allocation for the respective user based on determining that the respective user is not likely to be influenced to perform the action by the distribution of the budget to the different user;

iteratively adjusting the budget allocation for each of the multiple users based on updates to the user association graph and the item-item association graph; and iteratively assigning a variable portion of the budget allocation to each of the multiple users based on the iteratively adjusted budget allocation to maximize the multi-item influence.

19. The method of claim 18, further comprising:

assigning the variable portion of the budget allocation to any number of the multiple users based on the social correspondence between the multiple users to maximize the user influence of the multiple items.

20. The method of claim 18, wherein:

the items are consumer products;

the budget allocation is an advertising budget allocated to the multiple users to promote the consumer products; and the advertising budget is iteratively adjustable for allocation of the advertising budget to each of the multiple users to maximize the user influence of the consumer products.

* * * * *

UNITED STATES PATENT AND TRADEMARK OFFICE
CERTIFICATE OF CORRECTION

PATENT NO. : 11,593,893 B2
APPLICATION NO. : 16/677007
DATED : February 28, 2023
INVENTOR(S) : Ryan A. Rossi It is certified that error appears in the above-identified patent and that said Letters Patent is hereby corrected as shown below:

In the Claims

Column 24, Lines 44 to 45, after "based on", delete "user item graph".

Signed and Sealed this
Second Day of May, 2023

Katherine Kelly Vidal
*Director of the United States Patent and Trademark Office*